US011438269B2

(12) United States Patent
Ramamurthi

(10) Patent No.: US 11,438,269 B2
(45) Date of Patent: Sep. 6, 2022

(54) SYSTEMS AND METHODS FOR CONGESTION CONTROL IN AN INTEGRATED ACCESS AND BACKHAUL NETWORK

(71) Applicant: Verizon Patent and Licensing Inc., Basking Ridge, NJ (US)

(72) Inventor: Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 119 days.

(21) Appl. No.: 16/879,441

(22) Filed: May 20, 2020

(65) Prior Publication Data

US 2021/0367888 A1 Nov. 25, 2021

(51) Int. Cl.
*H04L 47/12* (2022.01)
*H04L 47/11* (2022.01)
*H04W 28/02* (2009.01)

(52) U.S. Cl.
CPC .............. *H04L 47/12* (2013.01); *H04L 47/11* (2013.01); *H04W 28/0289* (2013.01)

(58) Field of Classification Search
None
See application file for complete search history.

(56) References Cited

U.S. PATENT DOCUMENTS

| 2008/0075003 | A1* | 3/2008 | Lee ......................... | H04L 47/824 370/235 |
| 2016/0119844 | A1* | 4/2016 | Uchino .................. | H04W 36/14 370/229 |
| 2016/0134464 | A1* | 5/2016 | Centonza .......... | H04W 28/0247 370/236 |
| 2020/0260328 | A1* | 8/2020 | Lee ......................... | H04W 88/14 |
| 2021/0075547 | A1* | 3/2021 | Tao ......................... | H04L 1/188 |
| 2021/0168656 | A1* | 6/2021 | Li ........................... | H04W 28/0289 |
| 2021/0306904 | A1* | 9/2021 | Narasimha ........ | H04W 28/0289 |
| 2021/0314809 | A1* | 10/2021 | Teyeb ................... | H04W 76/12 |

* cited by examiner

*Primary Examiner* — Andre Tacdiran

(57) ABSTRACT

An intermediate IAB node may determine whether congestion data satisfies a first threshold and may provide the congestion data to a parent IAB node when the congestion data satisfies the first threshold to cause the parent IAB node to apply local congestion control.

20 Claims, 13 Drawing Sheets

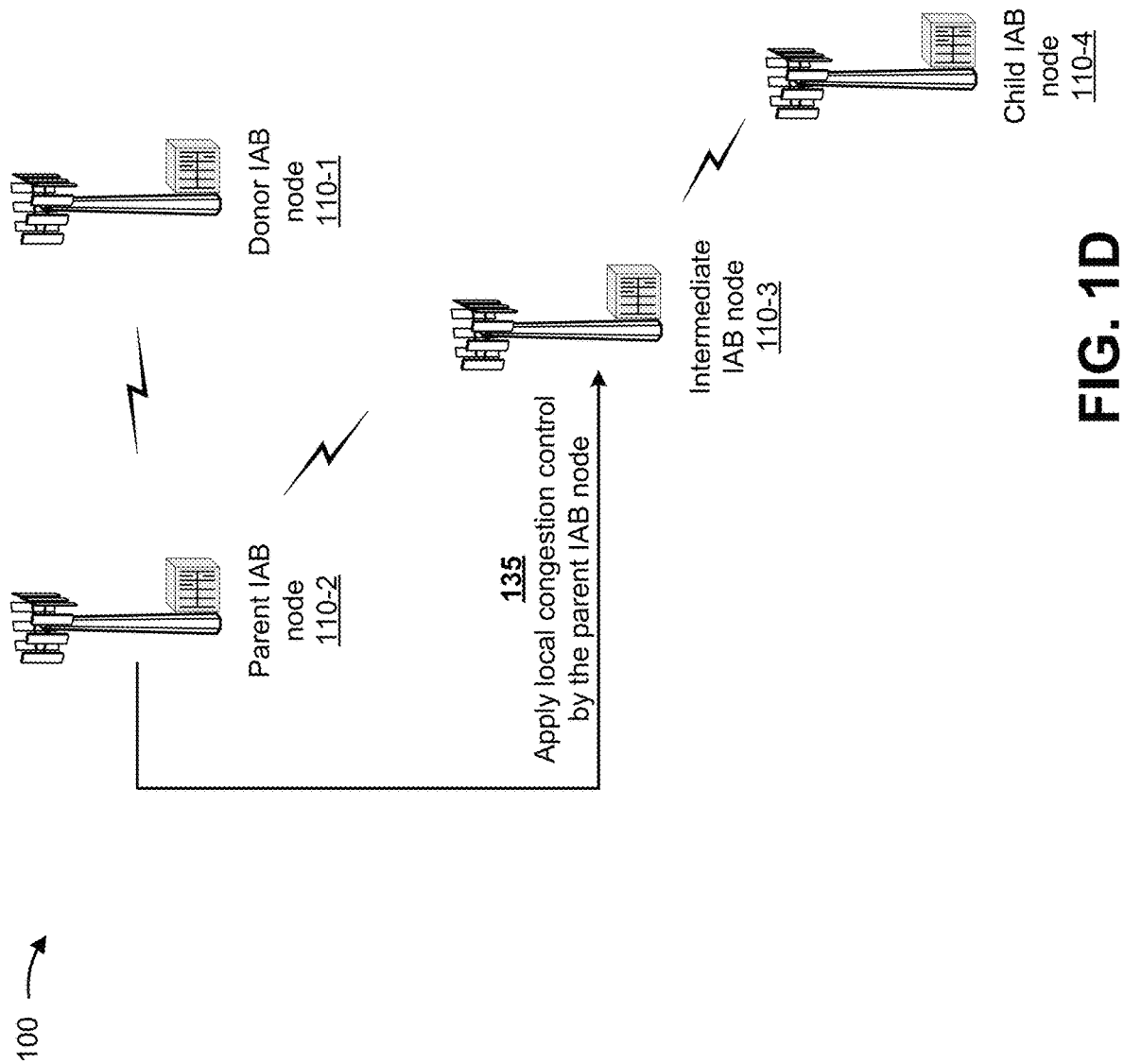

SYSTEMS AND METHODS FOR CONGESTION CONTROL IN AN INTEGRATED ACCESS AND BACKHAUL NETWORK

BACKGROUND

A mobile network may include a wireless backhaul network, sometimes referred to as an integrated access and backhaul (IAB) network. In an IAB network, at least one base station acts as an anchor base station (also referred to as an IAB donor) that communicates with a core network (via a wired backhaul link). The IAB network may include one or more non-anchor base stations (also referred to as IAB nodes), that may communicate directly with or indirectly with (for example, via one or more other non-anchor base stations) the anchor base station via one or more wireless backhaul links to form a backhaul path to the core network.

BRIEF DESCRIPTION OF THE DRAWINGS

FIGS. 1A-1J are diagrams of one or more example implementations described herein.

DETAILED DESCRIPTION OF PREFERRED EMBODIMENTS

Figure 1A:
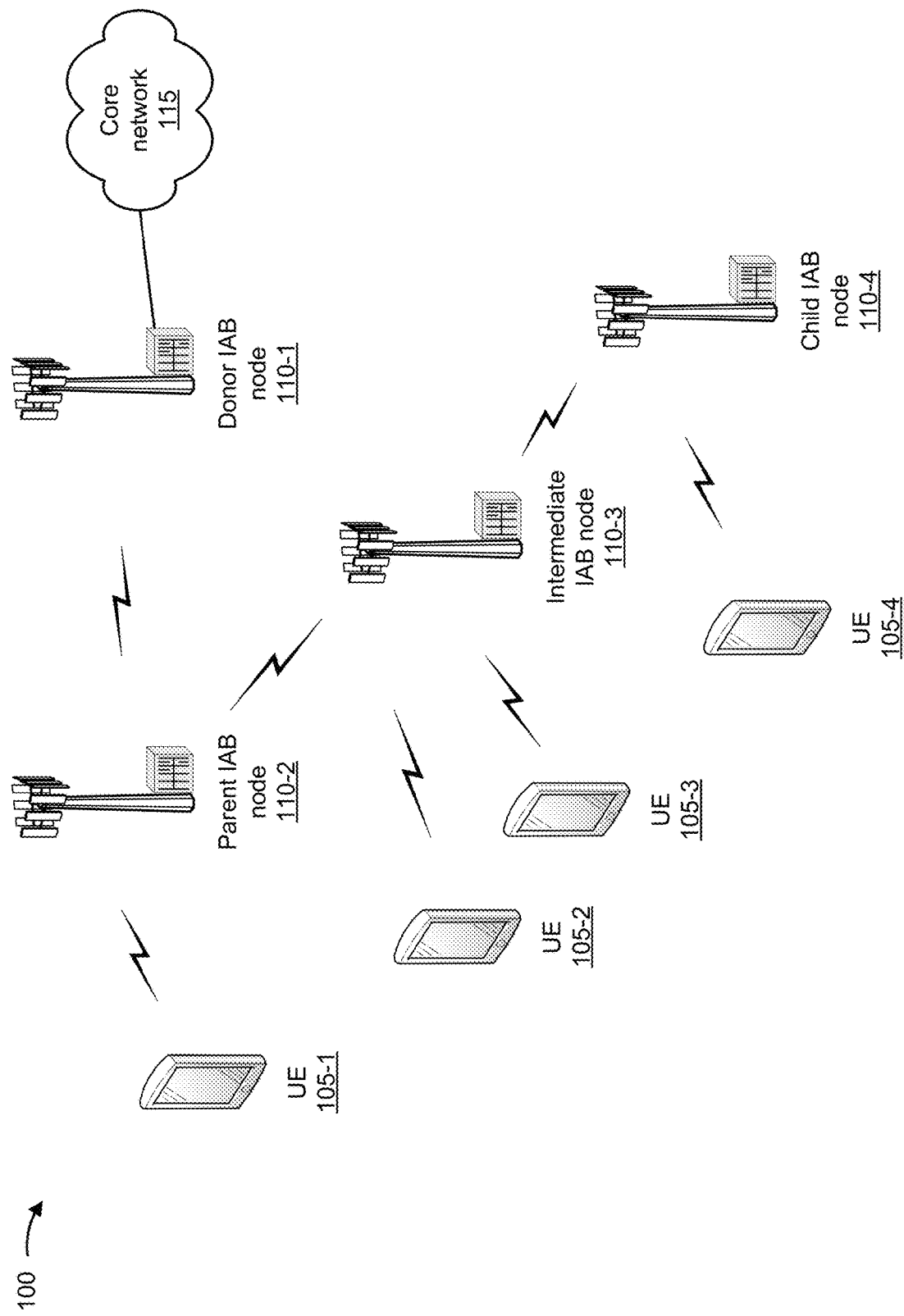

The following detailed description of example implementations refers to the accompanying drawings. The same reference numbers in different drawings may identify the same or similar elements.

As the reliance on wireless communications becomes more widespread, and as more user equipment demand access to mobile networks, managing and controlling network traffic becomes increasingly important. Such increases in network traffic call for more effective ways to monitor, control, and alleviate network congestion in a mobile network. Network congestion can occur when a base station associated with a coverage area simultaneously supporting multiple connections with multiple user equipment is at or beyond a load capacity of the base station.

In an IAB network, a donor IAB node may use a network controller to detect network congestion via an end-to-end (E2E) feedback loop formed with an access IAB node (e.g., a child IAB node), and may engage a corrective measure (e.g., a throttling technique, a buffering technique, blocking technique, and/or the like) that deliberately restricts certain network traffic in an attempt to alleviate network congestion at the access IAB node.

However, network congestion may occur at an intermediate IAB node wirelessly connected between the child IAB node and a parent IAB node that is wirelessly connected to the donor IAB node. Network congestion may occur at the intermediate IAB node independent of network congestion occurring at the IAB child node (e.g., network congestion may not occur at the child IAB node at a time when network congestion occurs at the intermediate IAB node). Because the donor IAB node detects network congestion via the E2E feedback loop formed with the child IAB node, the donor IAB node may not be able to detect network congestion occurring at the intermediate IAB node.

The congestion at the intermediate IAB node may cause the intermediate IAB node to drop packets and/or to delay the transmission of packets. The dropping of packets and/or delaying the transmission of packets may require the packets to be re-transmitted thereby causing additional computing resources (e.g., processor resources, memory resources, communication resources, and/or the like) to be utilized.

Some implementations described herein provide systems and methods for detecting and correcting network congestion occurring at an intermediate IAB node. The intermediate IAB node may perform a tiered approach to controlling network congestion at the intermediate IAB node. Based on the level of network congestion experienced and/or an amount of time for which the network congestion is experienced, the intermediate IAB node may cause one or more measures for reducing the network congestion to be performed.

The intermediate IAB node may compare congestion data associated with the intermediate IAB and a corresponding load threshold to determine whether network congestion exists at the intermediate IAB node. The intermediate IAB node may perform a first corrective action based on determining that the congestion data satisfies a first threshold for a first amount of time. The first corrective action may be a local control measure designed to alleviate traffic at the intermediate IAB node. In some instances (e.g., if the first corrective action is inadequate to alleviate traffic at the intermediate IAB node), the congestion data may satisfy a second load threshold for a second amount of time. The intermediate IAB node may perform a second corrective action (e.g., different from the first corrective action) designed to alleviate congestion at the intermediate IAB node. In some instances (e.g., if the first and second corrective actions are inadequate to alleviate traffic at the intermediate IAB node), the congestion data may satisfy a third load threshold for a third amount of time. The intermediate IAB node may perform a third corrective action (e.g., different from the first and second corrective actions) designed to alleviate congestion at the intermediate IAB node.

In this way, the systems and methods described herein minimize the occurrence of congestion within an IAB network, reduce downtime caused by network congestion, and help maintain network devices of the IAB network operating in optimal conditions. Furthermore, the systems and methods described herein enable user equipment, application network devices, and/or other devices connected via the IAB network to maintain connections to the IAB network. Moreover, end user devices experience fewer signal degradations, fewer signal losses, less latency, and overall better connection quality. Also, the systems and methods described herein provide automated processes related to detecting and controlling network congestion, which helps to conserve computational and network resources (e.g., processing resources, memory resources, power resources, communication resources, and/or the like) that may otherwise be used to detect and control network traffic.

FIGS. 1A-1J are diagrams of one or more examples implementations 100 described herein. As shown in FIGS. 1A-1J, the example implementation(s) 100 may include an IAB network including a donor IAB node 110-1, a parent IAB node 110-2, an intermediate IAB node 110-3, a child IAB node 110-4, and user equipment (UE) 105 (e.g., UE 105-1 through UE 105-4, as shown in FIG. 1A). The child IAB node 110-4, the parent IAB node 110-2, and/or the donor IAB node 110-1 may perform one or more functions to control network congestion occurring at the intermediate IAB node 110-3, as described below.

As shown in FIGS. 1A-1J, a network includes a wireless backhaul network, sometimes referred to as an integrated access and backhaul (IAB) network that includes a plurality of IAB nodes 110 that communicate with one or more UE 105 via one or more access communication links.

The donor IAB node 110-1 may be an anchor base station that communicates with a core network 115 via a wired or optical backhaul link, such as a fiber connection. As shown in FIG. 1A, the donor IAB node 110-1 is connected to the parent IAB node 110-2. For example, the donor IAB node 110-1 may be connected to the parent IAB node 110-2 via an F1 interface or any other wireless interface.

The parent IAB node 110-2, the intermediate IAB node 110-3, and the child IAB node 110-4 may be non-anchor base stations that communicate directly, or indirectly (e.g., via one or more other non-anchor base stations), with the anchor base station (e.g., donor IAB node 110-1) via one or more wireless backhaul links to form a backhaul path to the core network for carrying backhaul traffic. As shown in FIG. 1A, the intermediate IAB node 110-3 may be connected between the parent IAB node 110-2 and the child IAB node 110-4. For example, the intermediate IAB node 110-3 may be connected to the parent IAB node 110-2 and the child IAB node 110-4 via respective interfaces such as an F1 interface.

In some implementations, the intermediate IAB node 110-3 may detect network congestion at the intermediate IAB node 110-3. For example, the intermediate IAB node 110-3 may detect network congestion at the intermediate IAB node 110-3 based on congestion data associated with the intermediate IAB node. The congestion data may include information relating to a load level of the intermediate IAB node 110-3 over a particular time. For example, congestion data may include a number of unique user equipment simultaneously connected to the intermediate IAB node 110-3, a number of unique Radio Resource Control (RRC) connections, a number of Physical Resource Blocks (PRBs) in use, and/or another indication of the load level of the intermediate IAB node 110-3 at different points in time over the particular period of time.

In some implementations, the congestion data may be provided as a ratio between a number of connections in use and a number of available connections, a percentage of connections in use, and/or another indication of the capacity of the intermediate IAB node 110-3. In some implementations, the congestion data may be provided in relation to a capacity limit of the intermediate IAB node 110-3.

In some implementations, the intermediate IAB node 110-3 determines the congestion data based on monitoring traffic transmitted to and/or from the intermediate IAB node 110-3. Alternatively, and/or additionally, the intermediate IAB node 110-3 receives the congestion data from another device (e.g., donor IAB node 110-1, parent IAB node 110-2, and/or the like). The intermediate IAB node 110-3 may store the congestion data in a data structure (e.g., a database, a list, a table, and/or the like) accessible by the intermediate IAB node 110-3, and may update the congestion data periodically, intermittently, or continuously in real-time.

Figure 1B:
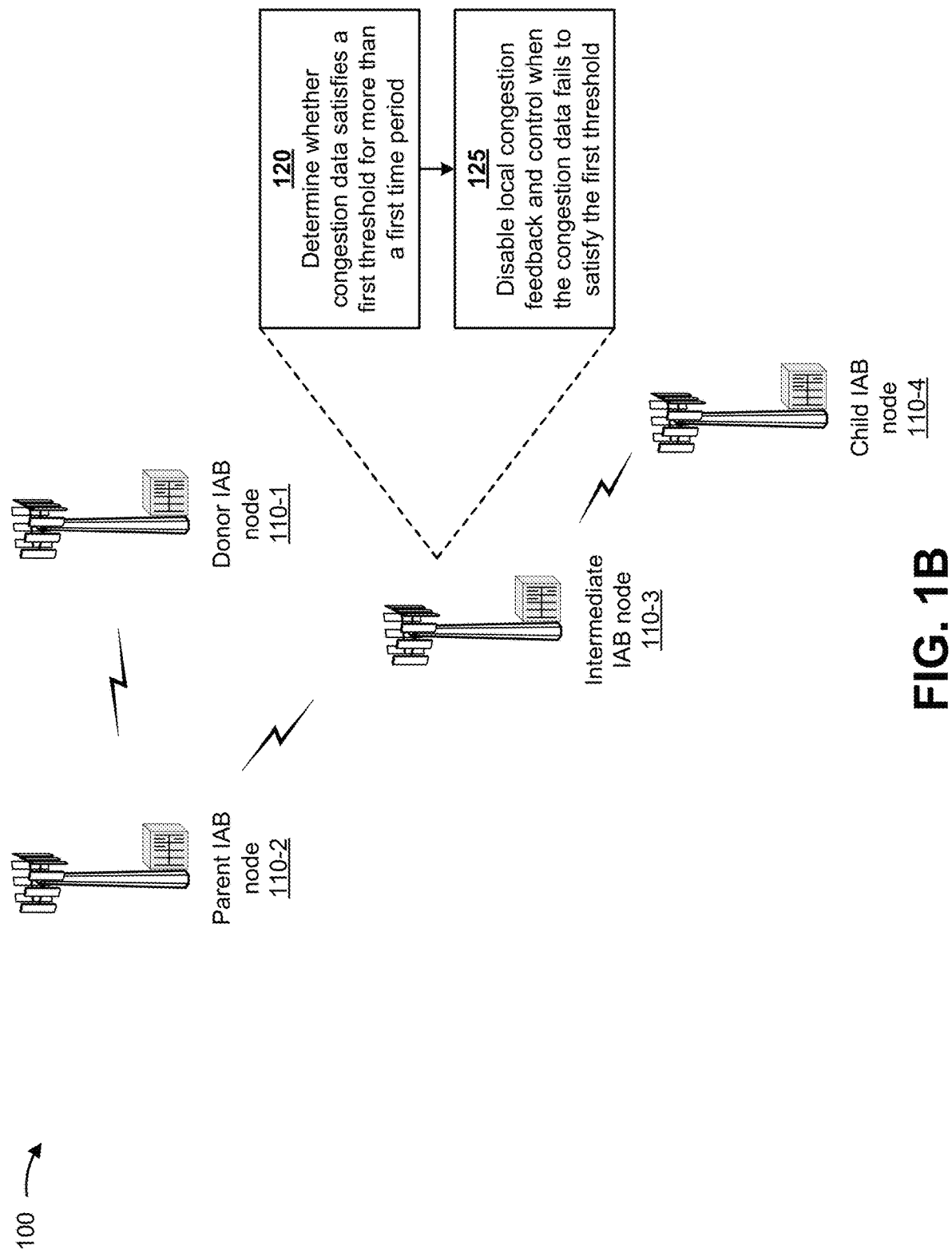

As shown in FIG. 1B, and by reference number 120, the intermediate IAB node 110-3 determines whether congestion data satisfies a first threshold for more than a first time period. The congestion data may include information relating to a load level of the intermediate IAB node 110-3 at particular points of time over a particular time (e.g., every second, every minute, every hour, and/or the like). In some implementations, the intermediate IAB node 110-3 compares the congestion data determined at multiple points in time and a first threshold and determines whether network congestion is occurring at the intermediate IAB node 110-3 for more than the first time period based on the comparison.

The first threshold may be defined in terms of a number of unique user equipment simultaneously connected to the coverage area, a number of unique RRC connections, a number of PRBs in use, a ratio between a number of connections in use and a number of available connections, a percentage of connections in use, and/or another indication of the load threshold. For example, the first threshold may be defined based on a capacity limit of the intermediate IAB node 110-3 (e.g., approximately 80% of the capacity limit of the intermediate IAB node 110-3, approximately 95% of the capacity limit of the intermediate IAB node 110-3, and/or the like).

In some implementations, the intermediate IAB node 110-3 determines that the congestion data does not satisfy the first threshold. For example, the intermediate IAB node 110-3 may determine that a capacity of the intermediate IAB node 110-3 was less than 80% of the capacity limit of the intermediate IAB node 110-3 for an entire period of time relating to the congestion data.

In some implementations, the intermediate IAB node 110-3 determines that one or more points of congestion data satisfy the first threshold but that the congestion data does not satisfy the first threshold for the first time period. For example, the first time period may be about one minute. The intermediate IAB node 110-3 may determine that the capacity of the intermediate IAB node 110-3 fails to be over 80% of the capacity limit of the intermediate IAB node 110-3 for at least about one minute.

As shown by reference number 125, the intermediate IAB node 110-3 disables local congestion feedback and control when the congestion fails to satisfy the first threshold. Disabling the local congestion feedback and control may prevent the intermediate IAB node 110-3 from providing congestion feedback information to the parent IAB node 110-2. In this way, the intermediate IAB node 110-3 may reduce an amount of congestion feedback information being transmitted to the parent IAB node 110-2. Reducing the amount of congestion feedback information may conserve computing resources that may otherwise be used to process congestion feedback information indicating that the intermediate IAB node 110-3 is not currently experiencing congestion at the intermediate IAB node 110-3.

Figure 1C:
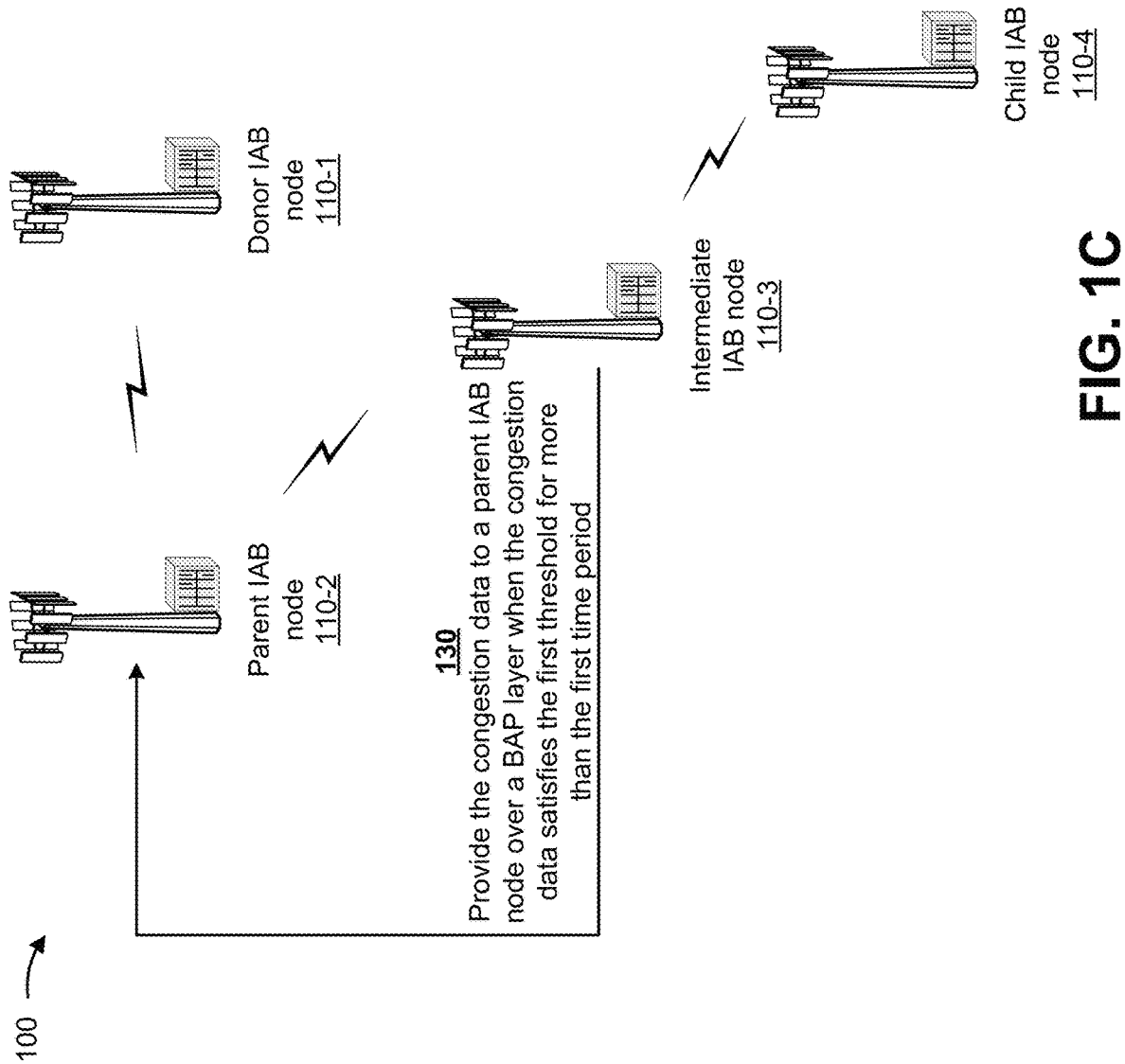

In some implementations, the intermediate IAB node 110-3 determines that the congestion data satisfies the first threshold for more than the first period of time. The first threshold and/or the first time period may be configured to correspond to network congestion caused by transient conditions experienced by the intermediate IAB node 110-3, such as an intermittent spike in network traffic caused by a large number of UE 105s traveling through a coverage area of the intermediate IAB node 110-3. As shown in FIG. 1C, and by reference number 130, the intermediate IAB node 110-3 provides the congestion data to the parent IAB node 110-2 over a backhaul adaption protocol (BAP) layer when the congestion data satisfies the first threshold for more than the first period of time.

The parent IAB node 110-2 may receive the congestion data via the BAP layer. The parent IAB node 110-2 may analyze the congestion data and determine that the network congestion at the intermediate IAB node 110-3 and may identify one or more local congestion control measures to be applied to alleviate the network congestion at the intermediate IAB node 110-3.

As shown in FIG. 1D, and by reference number 135, the intermediate IAB node 110-3 applies local congestion control with the parent IAB node 110-2 based on the congestion data satisfying the first threshold for more than the first period of time. In some implementations, the local congestion control measures include scheduling additional resources for the intermediate IAB node 110-3. For example, the parent IAB node 110-2 may schedule additional uplink resources, additional downlink resources, and/or the like for the intermediate IAB node 110-3 to alleviate the network congestion at the intermediate IAB node 110-3.

Figure 1E:
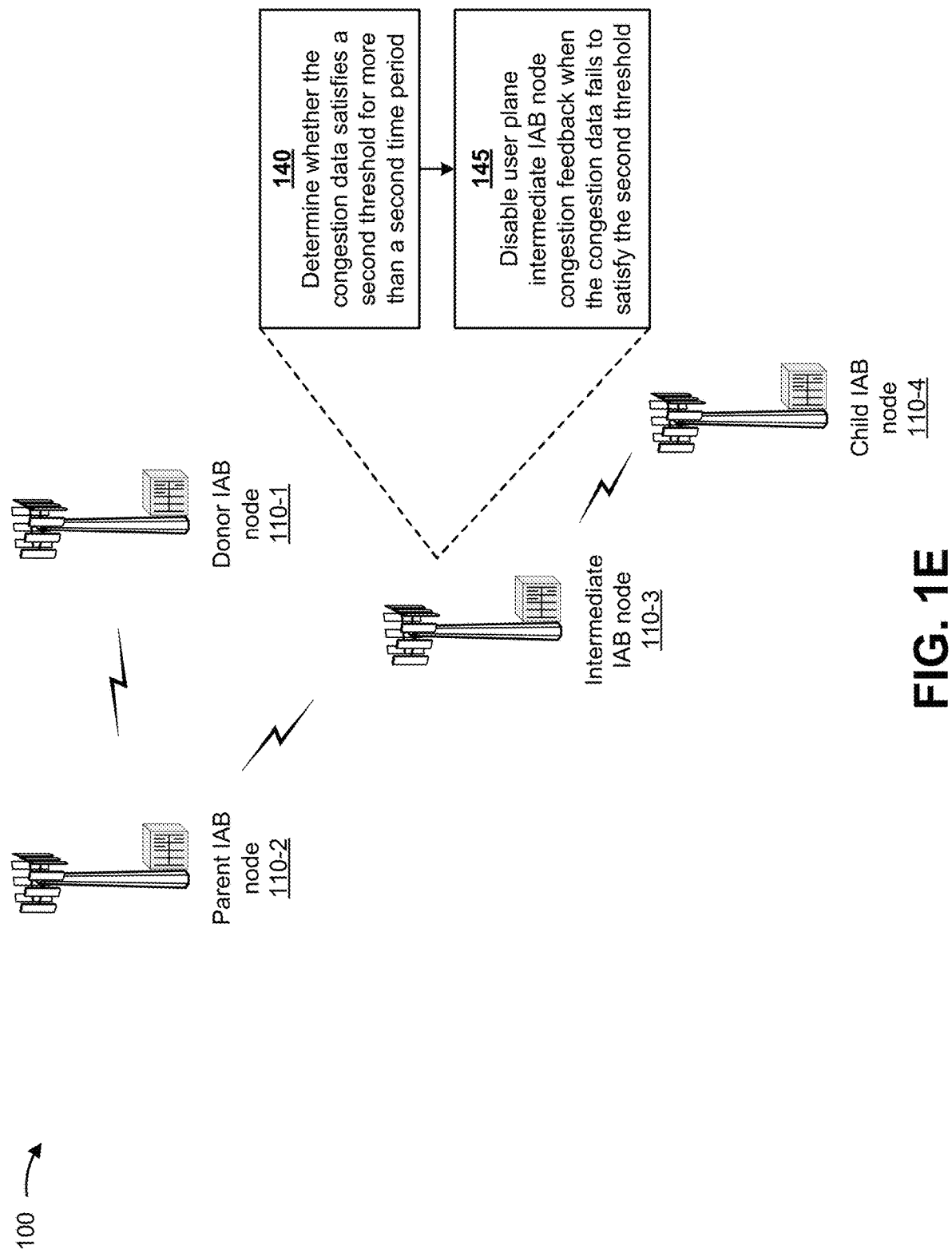

The intermediate IAB node 110-3 may determine whether the local congestion control measures alleviated the network congestion at the intermediate IAB node 110-3. The intermediate IAB node 110-3 may obtain congestion data for a period of time occurring after the local congestion control measures have been applied. As shown in FIG. 1E, and by reference number 140, the intermediate IAB node 110-3 determines whether the congestion data satisfies a second threshold for more than a second time period.

In some implementations, the second threshold includes (e.g., is greater than) the first threshold. For example, the first threshold may be 80% of the capacity limit of the intermediate IAB node 110-3 and the second threshold may be 90% of the capacity limit of the intermediate IAB node 110-3.

In some implementations, the second threshold is the same as the first threshold and the intermediate IAB node 110-3 determines whether the congestion data continues to satisfy the first threshold for an additional period of time. For example, the intermediate IAB node 110-3 may determine whether the local congestion control measures have been effective in reducing the network congestion at the intermediate IAB node 110-3 (e.g., whether the intermediate IAB node 110-3 is continuing to remain at a capacity level over 80% of a capacity of the intermediate IAB node 110-3).

In some implementations, the intermediate IAB node 110-3 determines that the congestion data fails to satisfy the second threshold for the second period of time. For example, the intermediate IAB node 110-3 may determine, based on the congestion data, that applying the local control measures has resulted in a reduction in the network congestion at the intermediate IAB node 110-3. As shown by reference number 145, the intermediate IAB node 110-3 disables user plane intermediate IAB node congestion feedback when the congestion data fails to satisfy the second threshold.

Disabling the user plane intermediate IAB node congestion feedback may prevent the intermediate IAB node 110-3 from providing congestion feedback information to the donor IAB node 110-1. In this way, the intermediate IAB node 110-3 may reduce an amount of congestion feedback information being transmitted to the donor IAB node 110-1. Reducing the amount of congestion feedback information may conserve computing resources that may otherwise be used to process congestion feedback information indicating that the intermediate IAB node 110-3 is not currently experiencing congestion at the intermediate IAB node 110-3.

In some implementations, the congestion data may continue to satisfy the first threshold for a subsequent first time period. The intermediate IAB node 110-3 may transmit congestion control data to the parent IAB node 110-2 over the BAP layer and the intermediate IAB node 110-3 may apply local congestion control measure with the parent IAB node 110-2, in a manner similar to that described above with respect to FIGS. 1C and 1D.

Figure 1F:
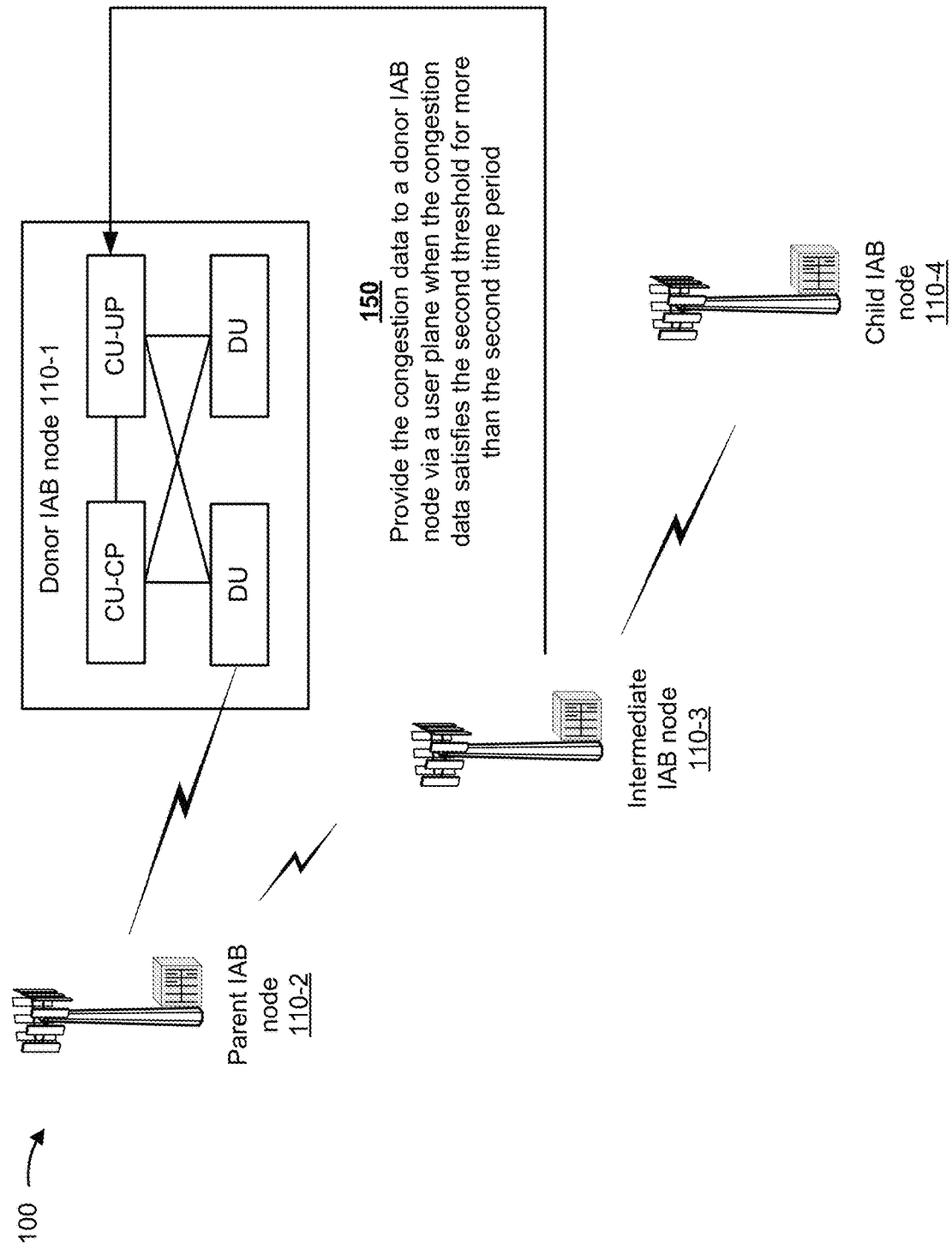

In some implementations, the intermediate IAB node 110-3 determines that the congestion data satisfies the second threshold for more than the second time period. As shown in FIG. 1F, and by reference number 150, the intermediate IAB node 110-3 provides the congestion data to the donor IAB node 110-1 via a user plane when the congestion data satisfies the second threshold for more than the second time period. The intermediate IAB node 110-3 may provide the congestion data to the donor IAB node 110-1 via the parent IAB node 110-2 over an F1-U interface.

The donor IAB node 110-1 may receive the congestion data from the intermediate IAB node 110-3 and may determine to apply user plane flow control to alleviate the network congestion at the intermediate IAB node 110-3. In some implementations, the donor IAB node 110-1 may determine to apply user plane flow control based on the congestion data and based on congestion data received from the child IAB node 110-4. The child IAB node 110-4 may provide congestion data to the donor IAB node 110-1 via an E2E feedback loop.

Figure 1G:
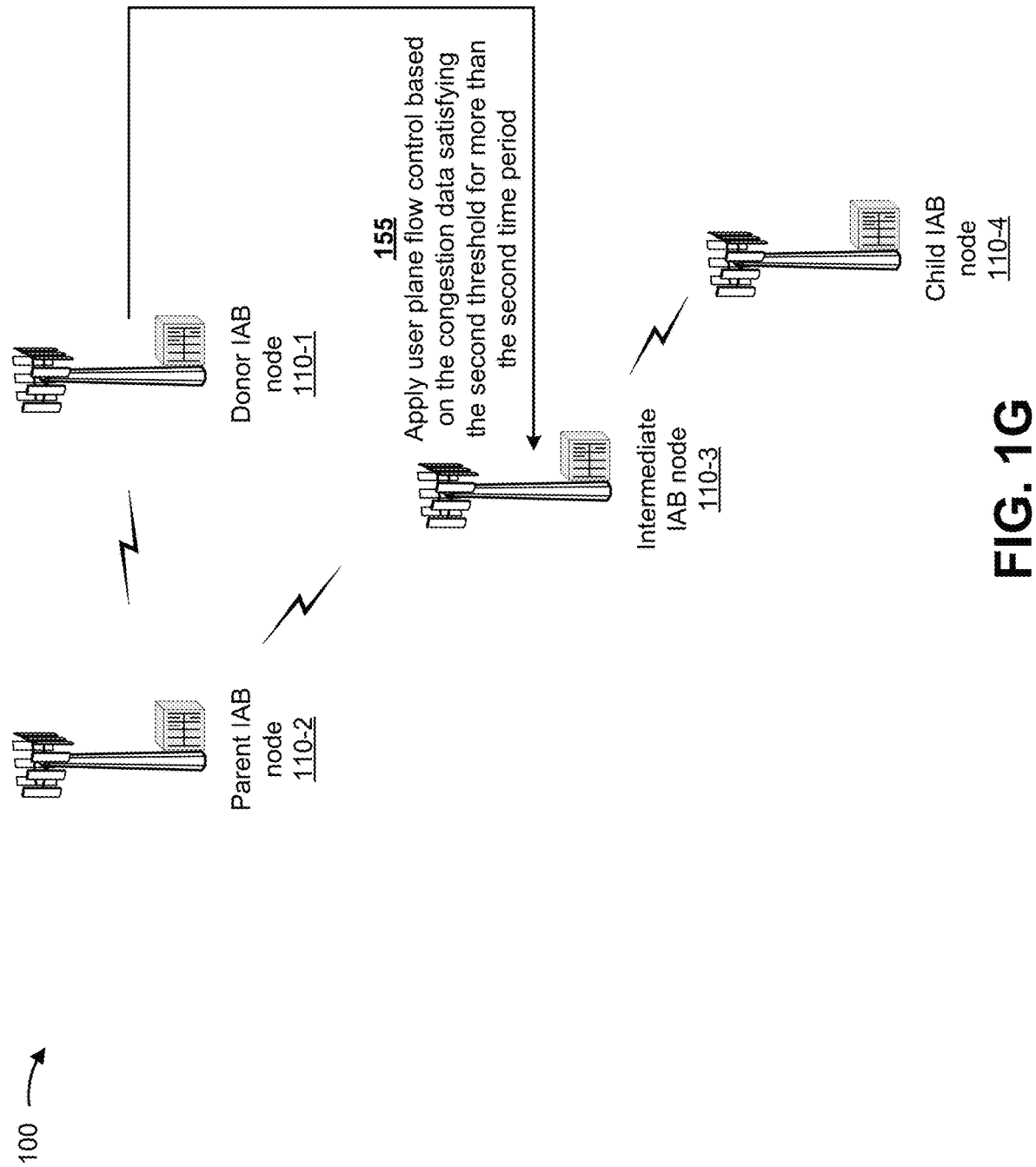

As shown in FIG. 1G, and by reference number 155, the donor IAB node 110-1 applies user plane flow control based on the congestion data satisfying the second threshold for more than the second time period. For example, the donor IAB node 110-1 may apply user plane flow control by allocating or scheduling additional resources for the intermediate IAB node 110-3, by causing the intermediate IAB node 110-3 to transmit data via an alternate path (e.g., the intermediate IAB node may be a dual-mode node that can transmit data via the IAB network and another network (e.g., a 4G network)), and/or the like.

Figure 1H:
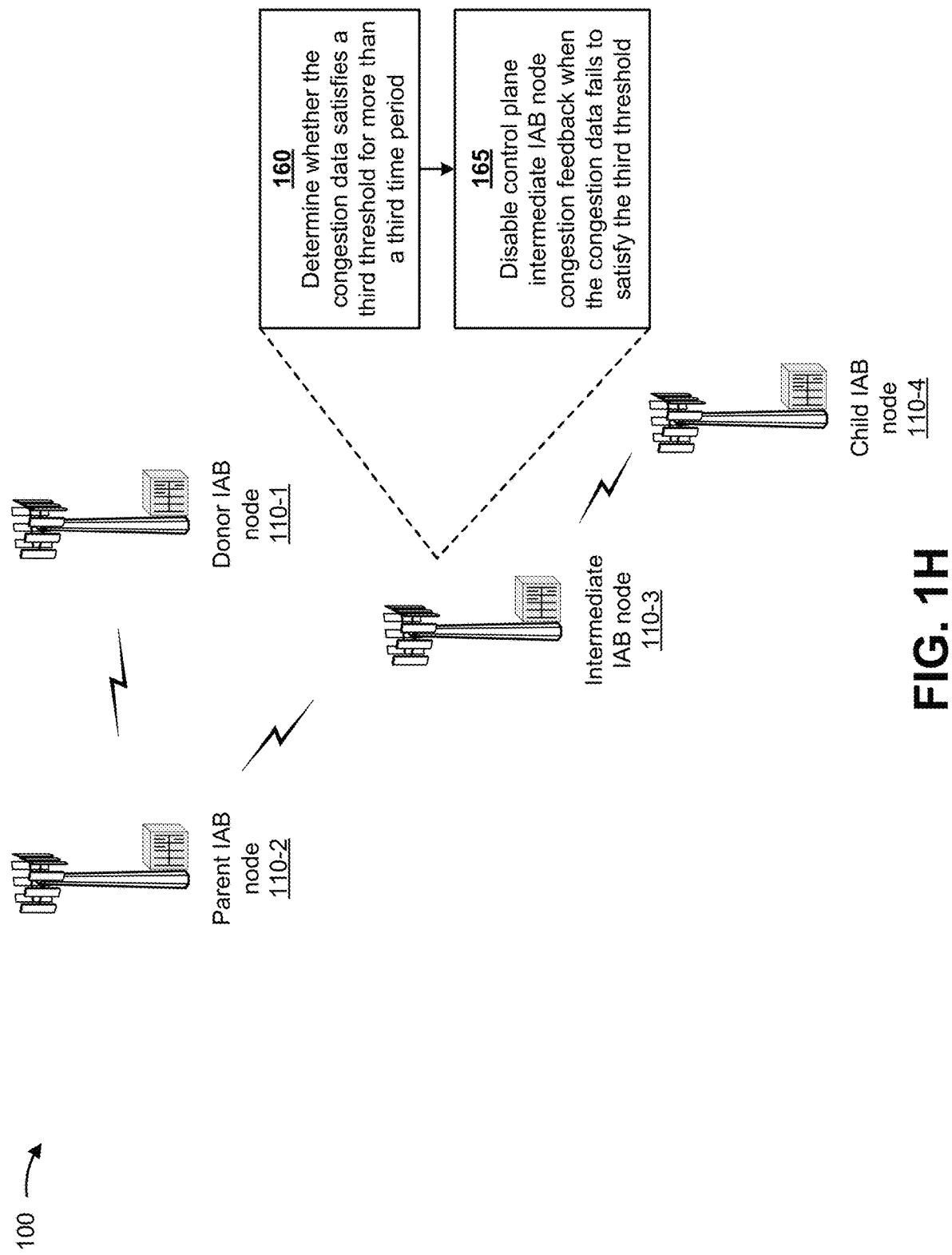

The intermediate IAB node 110-3 may determine whether applying the user plane flow control alleviated the network congestion at the intermediate IAB node 110-3. The intermediate IAB node 110-3 may obtain congestion data for a period of time occurring after the user plane flow control has been applied. As shown in FIG. 1H, and by reference number 160, the intermediate IAB node 110-3 determines whether the congestion data satisfies a third threshold for more than a third time period.

In some implementations, the third threshold includes (e.g., is greater than) the first threshold and/or the second threshold. For example, the first threshold may be 80% of the capacity limit of the intermediate IAB node 110-3, the second threshold may be 90% of the capacity limit of the intermediate IAB node 110-3, and the third threshold may be 95% of the capacity limit of the intermediate IAB node 110-3.

In some implementations, the third threshold is the same as the first threshold and/or the second threshold and the intermediate IAB node 110-3 determines whether the congestion data continues to satisfy the first threshold and/or the second threshold for an additional period of time. For example, the intermediate IAB node 110-3 may determine whether the local congestion control measures and or the user plane flow control have been effective in reducing the network congestion at the intermediate IAB node 110-3 (e.g., whether the intermediate IAB node 110-3 is continuing to remain at a capacity level over 80% of a capacity of the intermediate IAB node 110-3).

In some implementations, the intermediate IAB node 110-3 determines that the congestion data fails to satisfy the third threshold for the third period of time. For example, the intermediate IAB node 110-3 may determine, based on the congestion data, that applying the user plane flow control has resulted in a reduction in the network congestion at the intermediate IAB node 110-3. As shown by reference number 165, the intermediate IAB node 110-3 disables control plane intermediate IAB node congestion feedback when the congestion data fails to satisfy the third threshold.

Disabling the control plane intermediate IAB node congestion feedback may prevent the intermediate IAB node 110-3 from providing congestion feedback information to the donor IAB node 110-1 via the control plane. In this way, the intermediate IAB node 110-3 may reduce an amount of data being transmitted to the donor IAB node 110-1 via the control plane thereby conserving computing resources that would otherwise be utilized to process the data.

In some implementations, the congestion data may continue to satisfy the first threshold for a subsequent first time period. The intermediate IAB node 110-3 may transmit congestion control data to the parent IAB node 110-2 over the BAP layer and the intermediate IAB node 110-3 may apply local congestion control measure with the parent IAB node 110-2, in a manner similar to that described above with respect to FIGS. 1C and 1D.

In some implementations, the congestion data may continue to satisfy the second threshold for a subsequent second time period. The intermediate IAB node 110-3 may transmit congestion control data to the donor IAB node 110-1 via the user plane and the donor IAB node 110-1 may user plane flow control, in a manner similar to that described above with respect to FIGS. 1F and 1G.

Figure 1I:
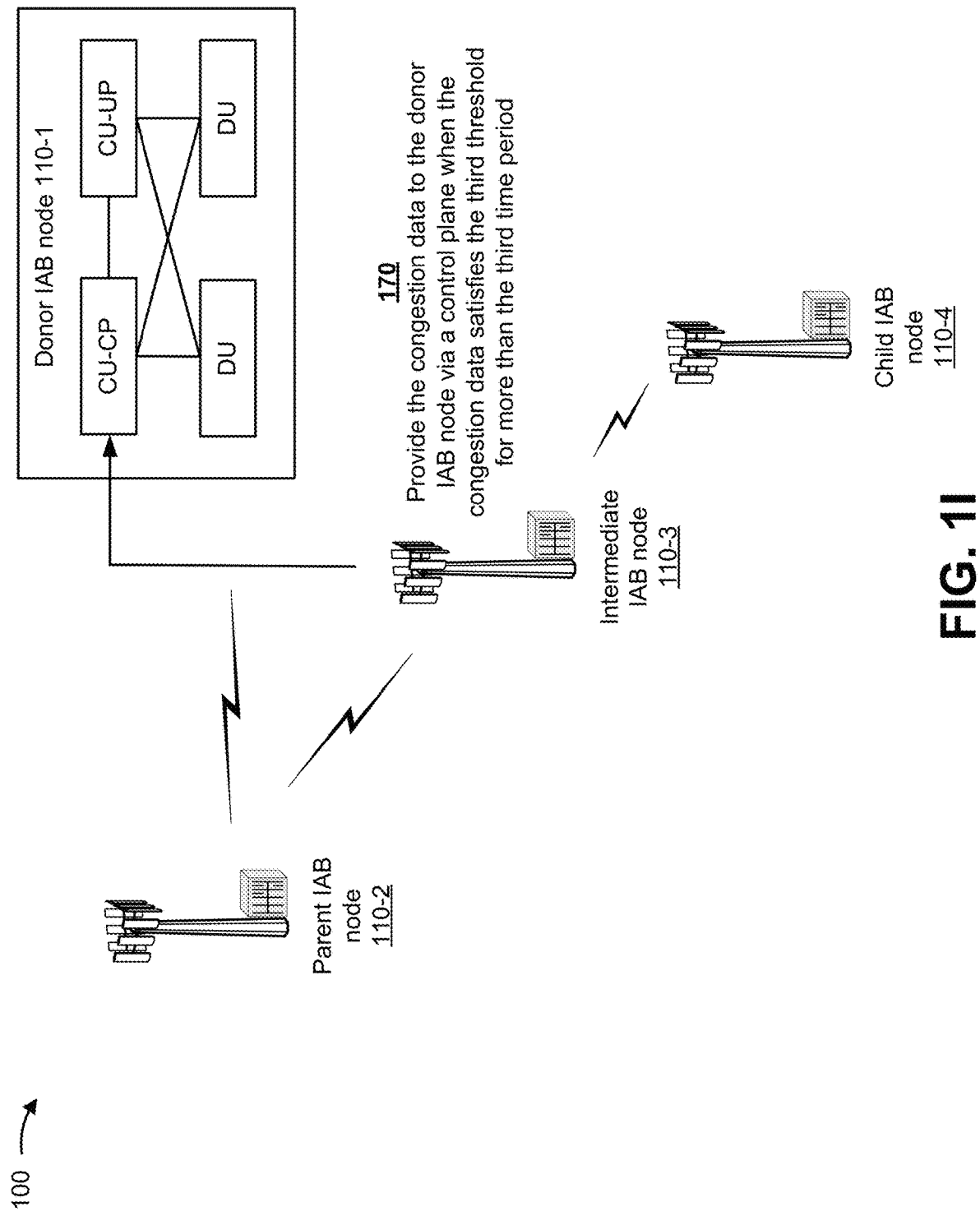

In some implementations, the intermediate IAB node 110-3 determines that the congestion data satisfies the third threshold for more than the third time period. As shown in FIG. 1I, and by reference number 170, the intermediate IAB node 110-3 provides the congestion data to the donor IAB node 110-1 via a control plane when the congestion data satisfies the third threshold form more than the third time period. The intermediate IAB node 110-3 may provide the congestion data to the donor IAB node 110-1 over an FI-C interface.

The donor IAB node 110-1 may receive the congestion data from the intermediate IAB node 110-3 via the control plane and may determine to apply control plane flow control to alleviate the network congestion at the intermediate IAB node 110-3. In some implementations, the donor IAB node 110-1 may determine to apply control plane flow control based on the congestion data and based on congestion data received from the child IAB node 110-4. The child IAB node 110-4 may provide congestion data to the donor IAB node 110-1 via an E2E feedback loop.

Figure 1J:
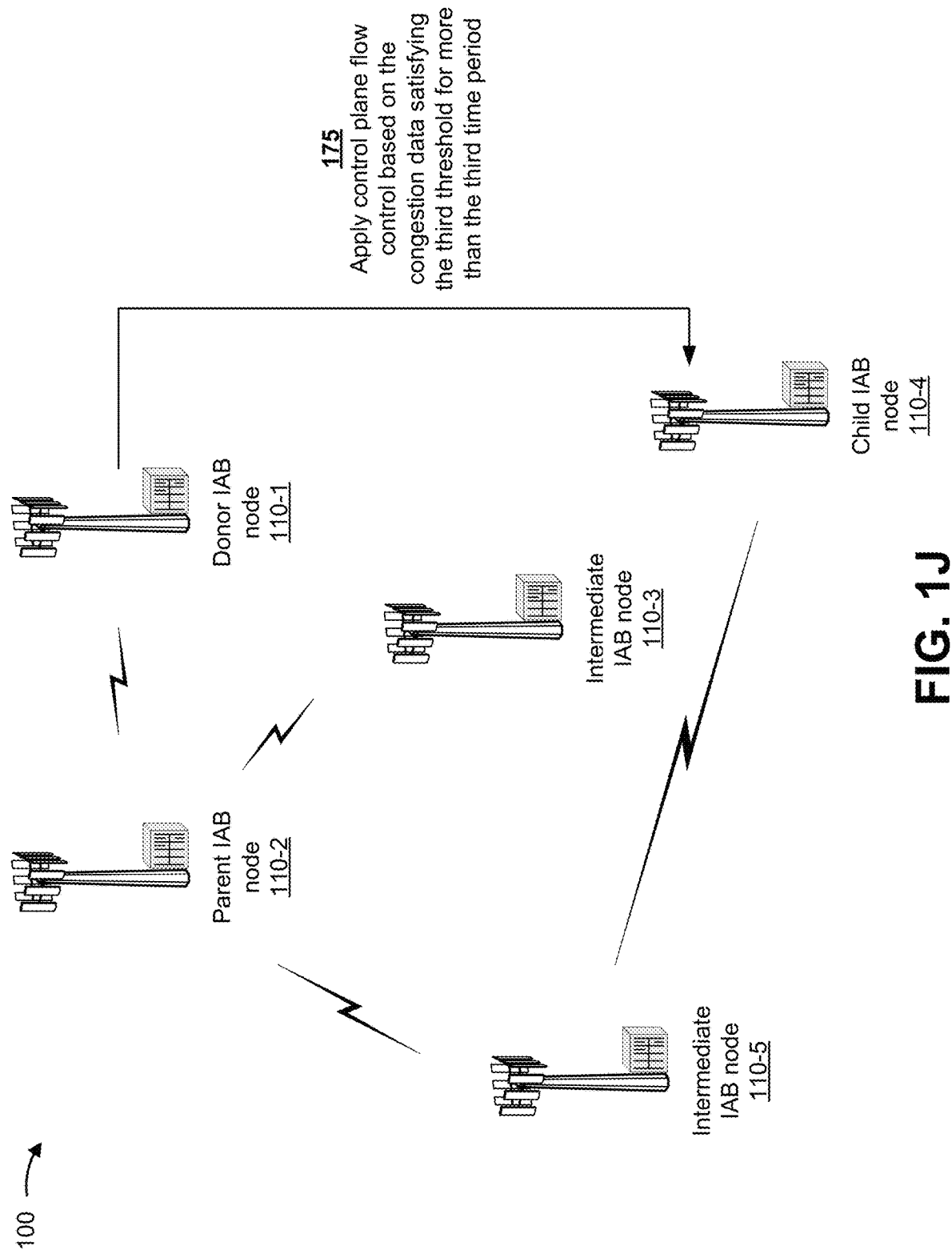

As shown in FIG. 1J, and by reference number 175, the donor IAB node 110-1 applies control plane flow control based on the congestion data satisfying the third threshold for more than the third time period. In some implementations, the donor IAB node 110-1 may apply control plane flow control by performing re-routing (e.g., if alternative routes exist with sufficient capacity), applying topology adaptation using alternative links, and/or the like.

For example, the donor IAB node 110-1 may determine that the child IAB node 110-4 is able to establish a wireless communication link with another IAB node (intermediate IAB node 110-5, as shown in FIG. 1J). The donor IAB node 110-1 may cause the child IAB node 110-4 to transmit data via the other IAB node rather than to the intermediate IAB node 110-3.

By utilizing a feedback loop which extends between the donor IAB node 110-1 and the intermediate IAB node 110-3, the donor IAB node 110-1 may monitor and control network congestion occurring at the intermediate IAB node 110-3 more effectively relative to other systems for monitoring and controlling network traffic at intermediate IAB nodes. Furthermore, by utilizing a three-tier approach to controlling network congestion at an intermediate IAB node, the intermediate IAB node 110-3 and/or the parent IAB node 110-2 is able to initiate corrective actions at the intermediate IAB node 110-3 earlier and avoid congestion events.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
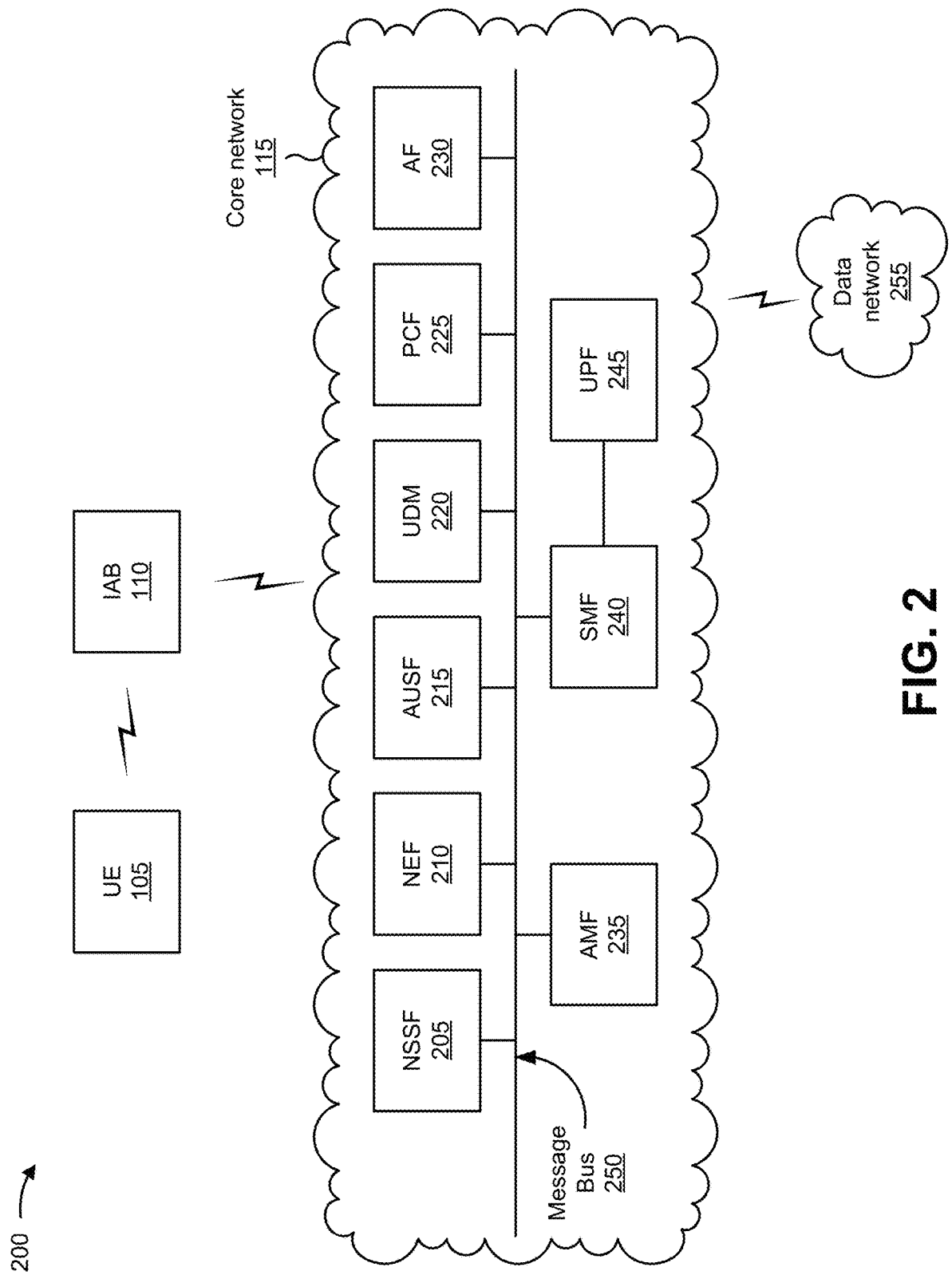
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include UE 105, IAB 110, core network 115, and a data network 255. Devices and/or networks of example environment 200 may interconnect via wired connections, wireless connections, or a combination of wired and wireless connections.

UE 105 includes one or more devices capable of receiving, generating, storing, processing, and/or providing information, such as information described herein. For example, UE 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

IAB 110 includes one or more devices for providing IAB functionality to devices connected to IAB 110. In some implementations, IAB 110 is an anchor node (e.g., IAB donor node) that connects to a core network via a wired connection. In these implementations, IAB 110 may connect to one or more devices of the core network that provide a core access and mobility management function. For example, an Ng interface of an anchor node may terminate at a core network. Additionally, or alternatively, IAB 110 may connect to one or more devices of the core network that provide a core access and mobility management function (e.g., AMF). In some implementations, IAB 110 includes a base station, such as an anchor base station.

In some implementations, IAB 110 is a non-anchor node (e.g., a parent IAB node, an intermediate IAB node, a child IAB node, and/or the like). In these implementations, IAB 110 may include mobile terminal (MT) functions (also sometimes referred to as UE functions (UEF)) and distributed unit (DU) functions (also sometimes referred to as access node functions (ANF)). The MT functions may be controlled and/or scheduled by another non-anchor node and/or an anchor node. The DU functions may control and/or schedule other non-anchor nodes and/or UEs 105.

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture, a 4G core network, and/or the like.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, and/or the like. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for UE 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating UE 105 in the wireless telecommunications system.

UDM 220 includes one or more devices that store user data and profiles in the wireless telecommunications system. UDM 220 may be used for fixed access, mobile access, and/or the like, in core network 115.

PCF 225 includes one or more devices that provide a policy framework that incorporates network slicing, roaming, packet processing, mobility management, and/or the like.

AF 230 includes one or more devices that support application influence on traffic routing, access to NEF 210, policy control, and/or the like.

AMF 235 includes one or more devices that act as a termination point for non-access stratum (NAS) signaling, mobility management, and/or the like.

SMF 240 includes one or more devices that support the establishment, modification, and release of communication sessions in the wireless telecommunications system. For example, SMF 240 may configure traffic steering policies at UPF 245, enforce user equipment IP address allocation and policies, and/or the like.

UPF 245 includes one or more devices that serve as an anchor point for intraRAT and/or interRAT mobility. UPF 245 may apply rules to packets, such as rules pertaining to packet routing, traffic reporting, handling user plane QoS, and/or the like.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
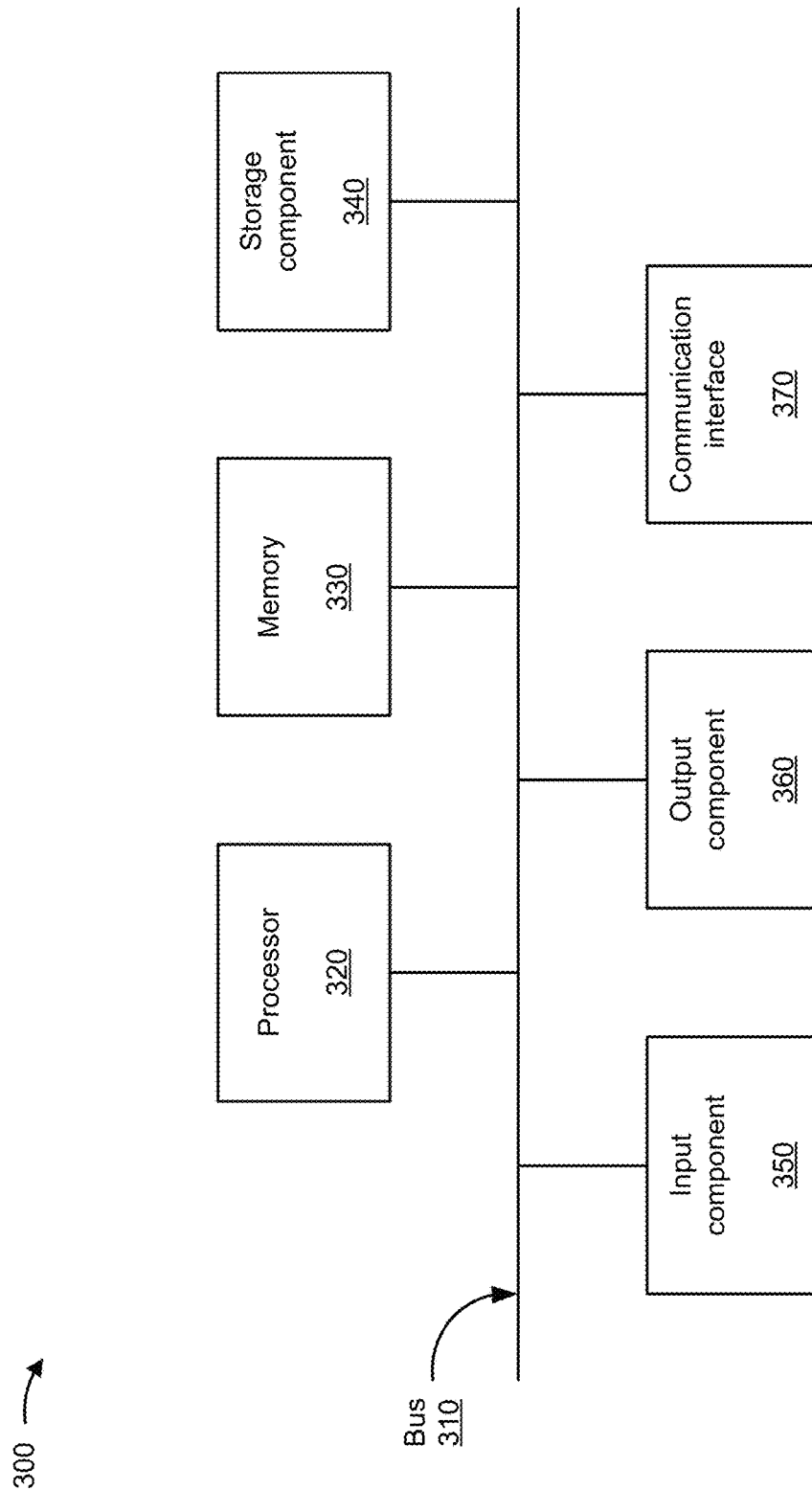
FIG. 3 is a diagram of example components of one or more devices of FIG. 2.

FIG. 3 is a diagram of example components of a device 300. Device 300 may correspond to UE 105, a base station of IAB 110, NSSF 205, NEF 210, AUSF 215, UDM 220, PCF 225, AF 230, AMF 235, SMF 240, and/or UPF 245. In some implementations, UE 105, the base station of IAB 110, NSSF 205, NEF 210, AUSF 215, UDM 220, PCF 225, AF 230, AMF 235, SMF 240, and/or UPF 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS)

component, an accelerometer, a gyroscope, and/or an actuator). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, an RF interface, a universal serial bus (USB) interface, a wireless local area interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
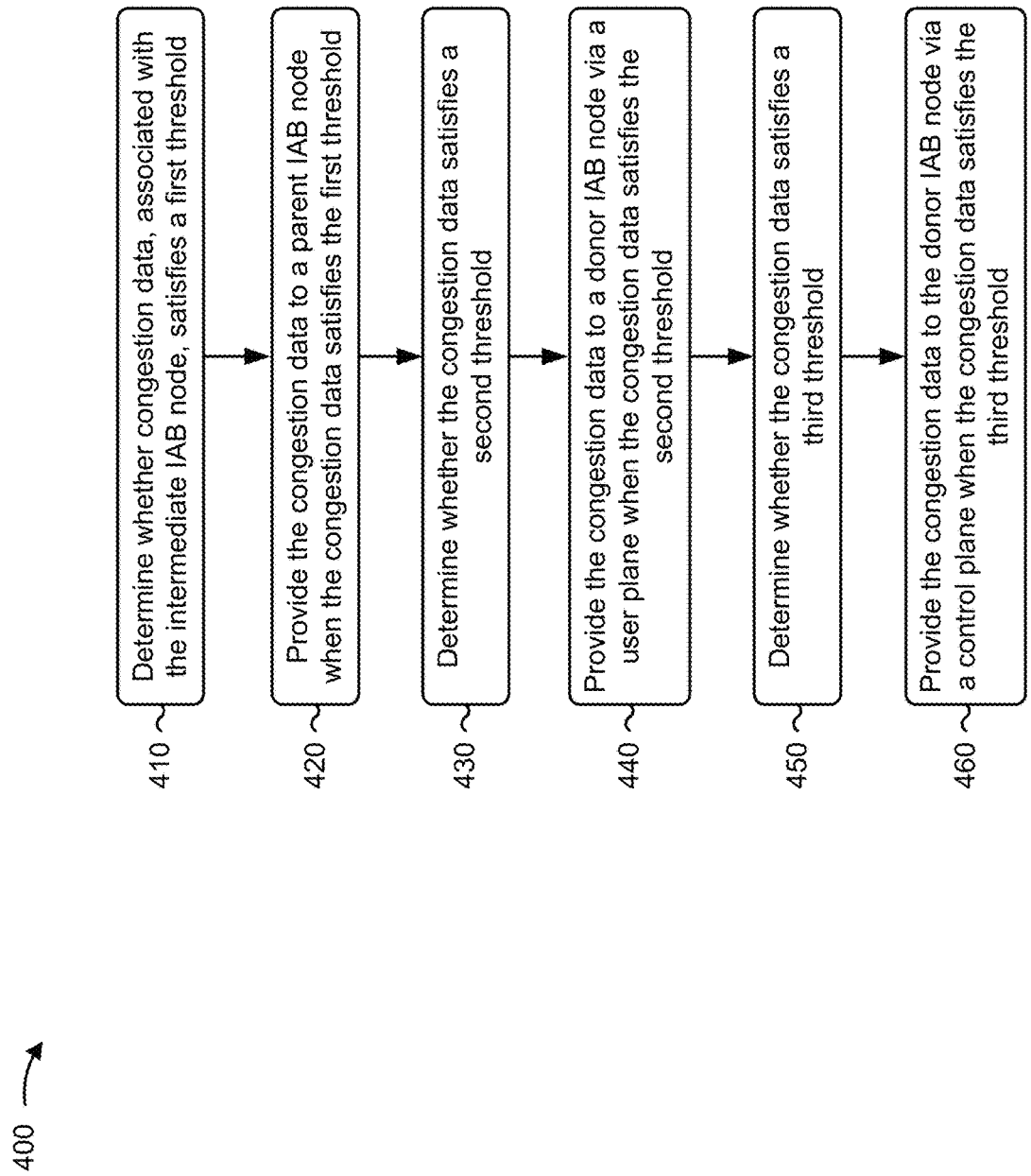
FIG. 4 is a flow chart of an example process relating to congestion control in an IAB network.

FIG. 4 is a flow chart of an example process 400 associated with systems and methods for congestion control in IAB networks. In some implementations, one or more process blocks of FIG. 4 may be performed by an intermediate IAB node (e.g., intermediate IAB node 110-3). In some implementations, one or more process blocks of FIG. 4 may be performed by another device or a group of devices separate from or including the intermediate IAB node, such as donor IAB node 110-1, parent IAB node 110-2, child IAB node 110-4, and/or the like. Additionally, or alternatively, one or more process blocks of FIG. 4 may be performed by one or more components of a device 300, such as processor 320, memory 330, storage component 340, input component 350, output component 360, communication interface 370, and/or the like.

As shown in FIG. 4, process 400 may include determining whether congestion data, associated with the intermediate IAB node, satisfies a first threshold for more than a first time period (block 410). For example, the intermediate IAB node may determine, backhaul (IAB) node, whether congestion data, associated with the intermediate IAB node, satisfies a first threshold for more than a first time period, as described above.

In some implementations, process 400 may include receiving the congestion data based on interactions by the intermediate IAB node with one or more user equipment, the child IAB node, or the parent IAB node.

As further shown in FIG. 4, process 400 may include providing the congestion data to a parent IAB node when the congestion data satisfies the first threshold for more than the first time period (block 420). For example, the intermediate IAB node may provide the congestion data to a parent IAB node when the congestion data satisfies the first threshold for more than the first time period, as described above. In some implementations, providing the congestion data causes the parent IAB node to apply local congestion control at the intermediate IAB node.

The congestion data may be provided to the parent IAB node over a backhaul adaptation protocol layer when the congestion data satisfies the first threshold for more than the first time period.

Process 400 may include disabling local congestion feedback and control when the congestion data fails to satisfy the first threshold.

As further shown in FIG. 4, process 400 may include determining whether the congestion data satisfies a second threshold for more than a second time period (block 430). For example, the intermediate IAB node may determine whether the congestion data satisfies a second threshold for more than a second time period, as described above.

As further shown in FIG. 4, process 400 may include providing the congestion data to a donor IAB node via a user plane when the congestion data satisfies the second threshold for more than the second time period (block 440). For example, the intermediate IAB node may provide the congestion data to a donor IAB node via a user plane when the congestion data satisfies the second threshold for more than the second time period, as described above. In some implementations, providing the congestion data to the donor IAB node via the user plane causes the donor IAB node to apply user plane flow control based on the congestion data provided to the donor IAB node via the user plane and based on other congestion data provided to the donor IAB node by a child IAB node connected to the intermediate IAB node.

In some implementations, the donor IAB node may be connected to a wired backhaul network and the congestion data may be provided to the donor IAB node over an F1 user plane interface.

Process 400 may include disabling user plane congestion feedback when the congestion data fails to satisfy the second threshold.

As further shown in FIG. 4, process 400 may include determining whether the congestion data satisfies a third threshold for more than a third time period (block 450). For example, the intermediate IAB node may determine whether the congestion data satisfies a third threshold for more than a third time period, as described above.

As further shown in FIG. 4, process 400 may include providing the congestion data to the donor IAB node via a control plane when the congestion data satisfies the third threshold for more than the third time period (block 460). For example, the intermediate IAB node may provide the congestion data to the donor IAB node via a control plane when the congestion data satisfies the third threshold for more than the third time period, as described above. In some implementations, providing the congestion data to the donor IAB node via the control plane causes the donor IAB node to perform control plane flow control based on the congestion data provided to the donor IAB node via the control plane and based on the other congestion data provided to the donor IAB node by the child IAB node.

In some implementations, the congestion data may be provided to the donor IAB node over an F1 control plane interface.

The local congestion control, the user plane flow control, and the control plane flow control may reduce congestion associated with the intermediate IAB node.

Process 400 may include disabling control plane congestion feedback when the congestion data fails to satisfy the third threshold.

In some implementations, process 400 may include using alternate links to transmit data based on the donor IAB node applying the control plane flow control.

Process 400 may include providing feedback traffic upstream to the parent IAB node and providing the feedback traffic downstream to the child IAB node.

In some implementations, the intermediate IAB node, the parent IAB node, and the donor IAB node each include a gNodeB.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by an intermediate integrated access and backhaul (IAB) node, whether congestion data, associated with the intermediate IAB node, satisfies a first threshold;
   providing, by the intermediate IAB node, the congestion data to a parent IAB node when the congestion data satisfies the first threshold,
      wherein providing the congestion data causes the parent IAB node to apply local congestion control at the intermediate IAB node;
   determining, by the intermediate IAB node, whether the congestion data satisfies a second threshold; and
   providing, by the intermediate IAB node, the congestion data to a donor IAB node via a user plane when the congestion data satisfies the second threshold,
      wherein providing the congestion data to the donor IAB node via the user plane causes the donor IAB node to apply user plane flow control based on the congestion data provided to the donor IAB node via the user plane and based on other congestion data provided to the donor IAB node by a child IAB node connected to the intermediate IAB node.

2. The method of claim 1, further comprising:
   disabling local congestion feedback and control when the congestion data fails to satisfy the first threshold.

3. The method of claim 1, further comprising:
   disabling user plane congestion feedback when the congestion data fails to satisfy the second threshold.

4. The method of claim 1, further comprising:
   determining, by the intermediate IAB node, whether the congestion data satisfies a third threshold; and
   providing, by the intermediate IAB node, the congestion data to the donor IAB node via a control plane when the congestion data satisfies the third threshold,
      wherein providing the congestion data to the donor IAB node via the control plane causes the donor IAB node to perform control plane flow control based on the congestion data provided to the donor IAB node via the control plane and based on the other congestion data provided to the donor IAB node by a child IAB node connected to the intermediate IAB node.

5. The method of claim 4, further comprising:
   using alternate links to transmit data based on the donor IAB node applying the control plane flow control.

6. The method of claim 4, further comprising:
disabling control plane congestion feedback when the congestion data fails to satisfy the third threshold.

7. The method of claim 1, wherein the congestion data includes information associated with a load level of the intermediate IAB node over a particular time.

8. An intermediate integrated access and backhaul (IAB) node, comprising:
one or more processors configured to:
determine whether congestion data, associated with the intermediate IAB node, satisfies a first threshold;
selectively:
disable local congestion feedback and control when the congestion data fails to satisfy the first threshold, or
provide the congestion data to a first non-anchor IAB node when the congestion data satisfies the first threshold,
wherein providing the congestion data to the first non-anchor IAB node causes the first non-anchor IAB node to apply local congestion control based on the congestion data;
determine whether the congestion data satisfies a second threshold; and
selectively:
disable user plane congestion feedback when the congestion data fails to satisfy the second threshold, or
provide the congestion data to an anchor IAB node via a user plane when the congestion data satisfies the second threshold,
wherein providing the congestion data to the anchor IAB node via the user plane causes the anchor IAB node to apply user plane flow control based on the congestion data provided to the anchor IAB node via the user plane and based on other congestion data provided to the anchor IAB node by a second non-anchor IAB node associated with the intermediate IAB node.

9. The intermediate IAB node of claim 8, wherein the one or more processors are configured further to:
determine whether the congestion data satisfies a third threshold; and
provide the congestion data to the anchor IAB node via a control plane when the congestion data satisfies the third threshold,
wherein providing the congestion data to the anchor IAB node via the control plane causes the anchor IAB node to apply control plane flow control based on the congestion data provided to the anchor IAB node via the control plane and the other congestion data provided to the anchor IAB node by the second non-anchor IAB node.

10. The intermediate IAB node of claim 9, wherein the one or more processors, when providing the congestion data to the anchor IAB node via the user plane, are configured to:
provide the congestion data to the anchor IAB node over a user plane interface; and
wherein the one or more processors, when providing the congestion data to the anchor IAB node via the control plane, are configured to:
provide the congestion data to the anchor IAB node over a control plane interface.

11. The intermediate IAB node of claim 8, wherein the one or more processors are further configured to:
receive the congestion data based on interactions by the intermediate IAB node with:
one or more user equipment,
the first non-anchor IAB node, or
the second non-anchor IAB node.

12. The intermediate IAB node of claim 8, wherein the anchor IAB node is connected to a wired backhaul network.

13. The intermediate IAB node of claim 8, wherein the one or more processors are further configured to:
provide feedback traffic upstream to the first non-anchor IAB node; and
provide the feedback traffic downstream to the second non-anchor IAB node.

14. The intermediate IAB node of claim 8, wherein the intermediate IAB node, the first non-anchor IAB node, and the anchor IAB node each include a gNodeB.

15. A non-transitory computer-readable medium storing instructions, the instructions comprising:
one or more instructions that, when executed by one or more processors of an intermediate integrated access and backhaul (IAB) node, cause the one or more processors to:
determine whether congestion data, associated with the intermediate IAB node satisfies a first threshold;
provide the congestion data to a parent IAB node over a backhaul adaptation protocol layer when the congestion data satisfies the first threshold,
wherein providing the congestion data to the parent IAB node causes the parent IAB node to apply local congestion control based on the congestion data;
determine whether the congestion data satisfies a second threshold;
provide the congestion data to a donor IAB node, via a user plane and over a user plane interface, when the congestion data satisfies the second threshold,
wherein providing the congestion data to the donor IAB node via the user plane causes the donor IAB node to apply user plane flow control based on the congestion data provided to the donor IAB node via the user plane and based on other congestion data provided by a child IAB node;
determine whether the congestion data satisfies a third threshold; and
provide the congestion data to the donor IAB node, via a control plane and over a control plane interface, when the congestion data satisfies the third threshold,
wherein providing the congestion data to the donor IAB node via the control plane causes the donor IAB node to apply control plane flow control based on the congestion data provided to the donor IAB node via the control plane and based on the other congestion data provided by the child IAB node.

16. The non-transitory computer-readable medium of claim 15, wherein the one or more instructions, when executed by the one or more processors, further cause the one or more processors to one or more of:
disable local congestion feedback and control when the congestion data fails to satisfy the first threshold;
disable user plane congestion feedback when the congestion data fails to satisfy the second threshold; or
disable control plane congestion feedback when the congestion data fails to satisfy the third threshold.

17. The non-transitory computer-readable medium of claim 15, wherein the one or more instructions, when executed by the one or more processors, further cause the one or more processors to:
  use alternate links based on the donor IAB node applying the control plane flow control.

18. The non-transitory computer-readable medium of claim 15, wherein the user plane interface comprises an F1 user plane interface and the control plane interface comprises an F1 control plane interface.

19. The non-transitory computer-readable medium of claim 15, wherein the one or more instructions, when executed by the one or more processors, further cause the one or more processors to:
  receive the congestion data based on interactions by the intermediate IAB node with:
  one or more user equipment,
  the child IAB node, or
  the parent IAB node.

20. The non-transitory computer-readable medium of claim 15, wherein the one or more instructions, when executed by the one or more processors, further cause the one or more processors to:
  provide feedback traffic upstream to the parent IAB node; and
  provide the feedback traffic downstream to the child IAB node.

* * * * *